US012752886B2

(12) United States Patent
Millar

(10) Patent No.: US 12,752,886 B2
(45) Date of Patent: Oct. 6, 2026

(54) REMOVABLE LOCKING DEVICE

(71) Applicant: Russell John Millar, Seatoun (NZ)

(72) Inventor: Russell John Millar, Seatoun (NZ)

(73) Assignee: Gowings SHI Pty Ltd, Coffs Harbour (AU)

( * ) Notice: Subject to any disclaimer, the term of this patent is extended or adjusted under 35 U.S.C. 154(b) by 418 days.

(21) Appl. No.: 18/273,492

(22) PCT Filed: Jan. 20, 2022

(86) PCT No.: PCT/NZ2022/050006
§ 371 (c)(1),
(2) Date: Jul. 20, 2023

(87) PCT Pub. No.: WO2022/158988
PCT Pub. Date: Jul. 28, 2022

(65) Prior Publication Data

US 2024/0124103 A1 Apr. 18, 2024

(30) Foreign Application Priority Data

Jan. 21, 2021 (NZ) ........................................ 772160

(51) Int. Cl.
*B63B 32/73* (2020.01)
*F16B 21/16* (2006.01)

(52) U.S. Cl.
CPC ............ *B63B 32/73* (2020.02); *F16B 21/165* (2013.01)

(58) Field of Classification Search
CPC ............................... F16B 21/16; F16B 21/165
See application file for complete search history.

(56) References Cited

U.S. PATENT DOCUMENTS 2,642,689 A * 6/1953 Cline ...................... F41C 23/02 24/607
3,052,940 A * 9/1962 Sellers .................. F16B 21/165 411/348

(Continued)

FOREIGN PATENT DOCUMENTS

DE 202012011836 U1 1/2013
EP 1363029 11/2003

(Continued)

OTHER PUBLICATIONS

Search Report & Written Opinion issued in PCT/NZ2022/050006 (May 27, 2022).

(Continued)

*Primary Examiner* — Brian O Peters
(74) *Attorney, Agent, or Firm* — Barnes & Thornburg LLP

(57) ABSTRACT

A device for removably attaching two pieces of an apparatus (such as a leg rope to a surfboard) together is described which has two members (a first male member and a second female member) that are movable to be in two positions, one a locked position and the other an unlocking position. The first male member is joined to a first piece of the apparatus (such as the leg rope) and the second female member is joined to the other piece of the apparatus (such as the surfboard). Ball bearings are located in the device in cavities movable under a predetermined plan to allow the device to join the two pieces together in a locked position and to allow the first piece to be removed from the second piece in the unlocking position, operable under hand pressure.

13 Claims, 7 Drawing Sheets

(56) References Cited

U.S. PATENT DOCUMENTS

| | | | | |
|---|---|---|---|---|
| 3,252,721 | A * | 5/1966 | Weasler | F16D 1/116 403/318 |
| 3,302,960 | A * | 2/1967 | Herrmann | F16B 21/165 403/325 |
| 4,144,794 | A | 3/1979 | Silverman et al. | |
| 5,643,028 | A | 7/1997 | Craig | |
| 5,685,751 | A | 11/1997 | Feyas | |
| 8,690,626 | B2 | 4/2014 | Starck, Jr. et al. | |
| 9,669,906 | B2 | 6/2017 | Carnevali | |
| 10,538,297 | B2 | 1/2020 | Gunner | |
| 2002/0092137 | A1 | 7/2002 | Whitty | |
| 2008/0160848 | A1 | 7/2008 | French | |
| 2011/0312232 | A1 | 12/2011 | James, Jr. et al. | |
| 2013/0336719 | A1 | 12/2013 | Baus | |
| 2016/0146571 | A1 | 5/2016 | Howard | |
| 2018/0087867 | A1 | 3/2018 | Tower | |

FOREIGN PATENT DOCUMENTS

| | | | |
|---|---|---|---|
| EP | 1363029 | A1 | 11/2003 |
| WO | 2012082915 | A2 | 6/2012 |
| WO | WO 2012/082915 | | 6/2012 |

OTHER PUBLICATIONS

EP Communication Pursuant to Article 94(3) EPC, Application No. 22 705 185.1, Dated Jun. 30, 2025 for "Removable Locking Device".

Heavy Duty Push Button Swivel with Stainless Steel Base—Walmart; https://www.walmart.com/ip/Heavy-Duty-Push-Button-Swivel-with-Stainless-Steel-Base/3716884.

* cited by examiner

REMOVABLE LOCKING DEVICE

CROSS REFERENCE TO RELATED APPLICATIONS

This application is a U.S. nationalization under 35 U.S.C. § 371 of International Application No. PCT/NZ2022/050006, filed 20 Jan. 2022, which claims priority to New Zealand Patent Application No. 772160, filed 21 Jan. 2021. The disclosures set forth in the referenced applications are incorporated herein by reference in their entireties.

This invention relates a device for removably attaching two pieces of an apparatus together.

The invention will have applicability to attaching a leash between a board used in water sports such as surfboards, stand-up paddleboards and wake boards (a "board herein") and to the leg of a user. It will have uses in other industries such as in yachting.

BACKGROUND

Normally a user of a board used in water sports such as a surfer on a surfboard will attach one end of a leash to the board and the other end to one of their legs to stop the board being washed away when the user has fallen off or lost control of the board. The current method usually involves a flexible cord, normally called a leash, secured at a first end to the user's leg via a removable wrap, generally comprising Velcro strapping, and a thin cord such as of flexible urethane material, secured at the other end to a plug embedded within and secured by fibre glass into the board during manufacture.

The leash-to-plug connection usually involves tying the end of the thin cord to a cross bar within the embedded plug. A user often needs to disengage the leash from the plug for travel and such like. This can be a difficult operation.

OBJECT OF THE INVENTION

This invention has as its object a system that goes at least some way to ameliorating the above disadvantages or at least provide the public with a useful choice. In at least the preferred forms of the invention the leash is attached to the device in such a way that the leash can be separated from the device such as a surfboard without the need to untie the knot securing the leash to the plug secured within the device

SUMMARY OF THE INVENTION

In accordance with one aspect of this invention there is provided a device for removably connecting two pieces of an apparatus together comprising two members, a first male member and a second female member, the first male member securable to one piece of apparatus and the second female member being securable to the second piece of apparatus, the first male member being configured to be in two positions in relation to the second female member, a first locked position in which the first male member is locked to the second female member and therefore the two pieces of apparatus are connected and a second unlocking position in which the first male member can be separated from the second female member to disconnect the two pieces of apparatus, the first male member having two parts, a first outer part and a second inner part both configured to allow the inner part to be slidable within the outer part and locked against rotational movement of the inner part within the outer part, both parts being configured to receive ball bearings in an arrangement to permit the inner part to slidably move within the outer part under a locking force applied by a biasing member toward the locked position and under hand pressure applied to the inner part against the force applied by the biasing member to the unlocking position, the two parts and the positioning of each ball within the two parts, being configured to allow each part and each ball to move such that each ball is subject to the same pressure exerted in use of the device and is able to follow a predetermined program to move between a locked position and an unlocking position, and to allow hand pressure to be applied to the inner part to move to a position where the first male member is in the unlocking position.

Optionally in the device the hand pressure applied to the inner part to move it in the unlocking operation is in one direction and while hand pressure is maintained on the inner part, a further force can be applied, to the first male member, in a reverse direction to that of the hand force to separate the first member from the second member to thereby disconnect the two pieces of apparatus.

Optionally the inner and outer parts are configured to remain locked together as the first male member is disengaged from the second female member.

Optionally each ball bearing remains within the first male member when removed from the second female member.

As mentioned previously the invention has applicability as a device to removably connect a leg rope to a board for use in water sports such as a surfboard, wake board, stand-up paddle board and the like. The device will be further described of its use for that purpose. It will be appreciated that the optional features mentioned for that use can where appropriate be used in devices for other uses.

In accordance with a further aspect of this invention there is provided a device for removably connecting a leash to a board comprising a first leash connecting member (a first male member) attachable to the leash and engageable with a second board securing member (a second female member) securable to the board, the first male member being configured to have two positions, a first locked position, wherein the first male member is locked to the second female member, and a second unlocking position, wherein the first male member is removable from the second female member, wherein the first male member is configured to be able to change between the first and second positions by application of hand pressure.

In a further aspect of this invention there is provided a device for removably connecting a leash to a board comprising a first leash connecting member (a first male member) attachable to the leash and engageable with a second board securing member (a second female member) securable to the board, the first male member being configured to have two positions, a first locked position, wherein the first male member is locked to the second female member, and a second unlocking position, wherein the first male member is removable from the second female member, and wherein the first male member is configured to have ball bearings positioned such that the ball bearings can move between two positions, a first position where the first male member is locked to the second female member and a second position where the first male member can be removed from the second female member and wherein when removed from the second female member the first male member retains each ball bearing.

Optionally the hand pressure is exerted against that of a biasing force configured within the first male member to bias the first male member towards the locking position.

Optionally the first male member has a locking member configured to secure the first male member to the second female member to reach the first locked position and, on application of unlocking force applied by hand pressure to the locking member the locking, force of the biasing member is overcome to permit the first male member to reach the second unlocking position.

Optionally ball bearings are present in positions within the device, and each of the first male member, the second female member and the locking member are configured, along with the positioning of each ball, to permit each ball to be subject to the same pressure exerted in use of the device and to be movable under a predetermined program, between a locked position to lock the first male member to the second female member and an unlocking position where the first male member can be removed from the second female member.

Optionally the locking member comprises two parts, an inner part and an outer part both parts being configured to allow the inner part to be slidable within the outer part and locked against, rotational movement within the outer part, both parts being configured to receive the ball bearings in an arrangement to permit the inner part to slidably move within the outer part, under the locking force applied by the biasing member, to the locked position and under hand pressure applied to the inner part against the force applied by the biasing member, to the unlocking position, the two parts and the positioning of each ball within the two parts, being configured to allow each part and each ball to move for each ball to be able to follow its predetermined program, such that in the unlocking position the first male member can slide within the second female member to be removable from the second female member.

Optionally each ball is retained within the first male member when removed from the second female member.

Optionally the pressure to move from the locked position to the unlocking position is applied by hand in a direction that is maintained to hold the first male member in the unlocking position, and which prevents movement to disengage the first male member from the second female member in a direction other than that opposite to that applied by hand pressure.

Optionally the unlocking force can be the force applied by hand pressure (optionally exerted in a vertical direction in relation to the plane of the upper board surface when in a horizontal disposition). By "hand pressure" is meant the pressure applied by the hand itself or one or more fingers. The term finger includes a thumb.

Optionally the first male member has 3 or 4 ball bearings.

Optionally there are cavities in each of the first member and the second member between which each ball bearing moves to reach the first locked and second unlocking positions.

Optionally the biasing member is a corrosion resistant resilient plug or spring such as a stainless-steel spring.

Optionally rotational movement of the first male member when in the locked position is prevented by a locking pin anchoring the locking member within the first male member while allowing movement of the first male member relative to the second female member, in a direction substantially perpendicular to the notional plane of the rotational movement.

Optionally, the leash may be permanently attached to the first male member (the leash connecting member).

Optionally to detach the leash from the board all that is required is the disengagement of the first male member by downwardly directed hand pressure applied to the locking member to move it from its locked position to its unlocking position, followed by application of an upward force to separate the first male member from the second female member, thus avoiding the tying and untying of presently used leg ropes. The upward force optionally needs to be applied while the locking member remains in its unlocking position such as by continued application of downwards hand pressure. When in place on a surfboard, the combined action of downward hand pressure unlocking the locking member and an upward force (such as by gripping the outside of the first member by other means such as other fingers or the leash itself) avoids the potential inadvertent unlocking action when a rider steps on the first male member as the simultaneous application of an upward force is not then possible.

The invention also includes the combination of the first (leash-connecting) member and the leash manufactured and sold as separate parts in one package or separate packages or with the leash joined to the first (leash connecting) member.

The invention further includes a board manufactured and sold with the second female member secured within the board's surface.

DRAWINGS

The invention will now be described by way of example with reference to the accompanying drawings and in which:

FIG. 5 is a section taken along the line V-V shown in FIG. 14.

FIGS. 6 to 13 show movement of the parts of the device from that shown in FIG. 5.

The locking pin 16 shown in FIGS. 1 and 2 (which will be discussed below) is not shown in FIGS. 5 to 13.

Figure 5:
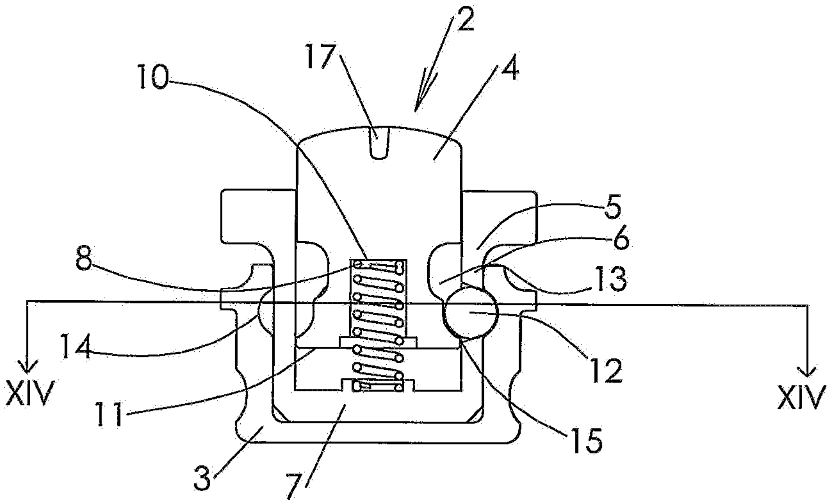
FIGS. 5 to 13 show schematically the relative movement of all the parts of the device from the locked position through the unlocking position and returning to the locking position.
Figure 14:
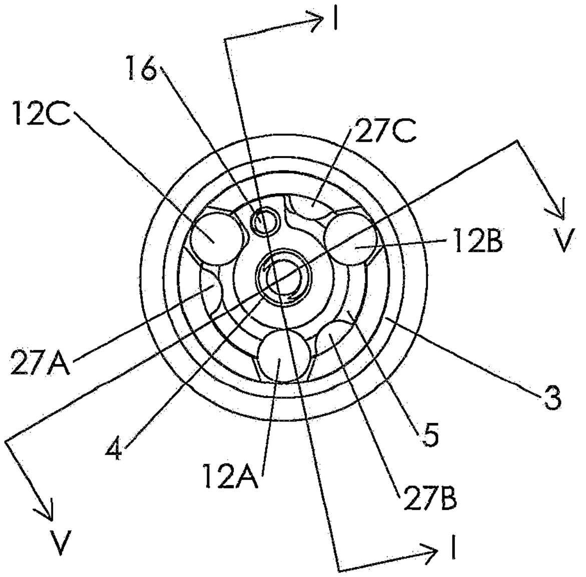

FIG. 14 is a cross-section of the device of the invention along the line XIV-XIV shown in FIG. 5.

The invention will be described in the following section with reference to its use in removably attaching a leash to a surfboard using the device of this invention. It will be appreciated that the invention is applicable to attaching a leash using the device of this invention to any other board used in water sports such as a wake board, windsurfing board or a stand-up paddle board.

The invention is also applicable to connecting two pieces of any other apparatus together.

The device of this invention is designed to be attached to a leash by any suitable means. It is envisaged that normally the leg rope will be sold joined to part of the device referred to herein interchangeably as the "first member", "first male member" or "first leash connecting member". The other part of the device described herein interchangeably as the "second member", "second female member" or "second board securing member", will be secured into the surfboard during manufacture of the surfboard by conventional means such as with fibre glass.

Throughout this specification the terms "leg rope" and "leash" will be used interchangeably.

Figure 1:
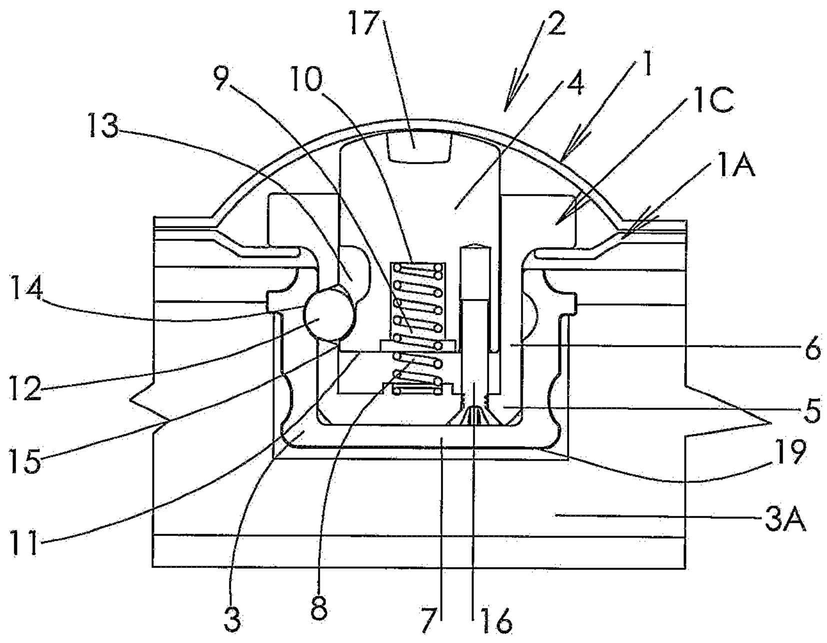
FIG. 1 is a half section of the device of the invention in its locking position and attached to the end of a leash and secured within a surfboard, along the line I-I shown in FIG. 14.

Referring to FIG. 1 a leg rope generally indicated by arrow 1 is secured to a first member which can conveniently be referred to as a first male member generally indicated by arrow 2, slidably fitting within a second member again for convenience referred to as a second female member 3. The leg rope can be secured to first male member 2 in any suitable way. Conventional systems can be used such as attaching the end of the leg rope to an anchoring flange IC covered by a soft outer casing 1A. The connection needs to be strong to remain intact during the stresses of use when surfing.

Figure 2:
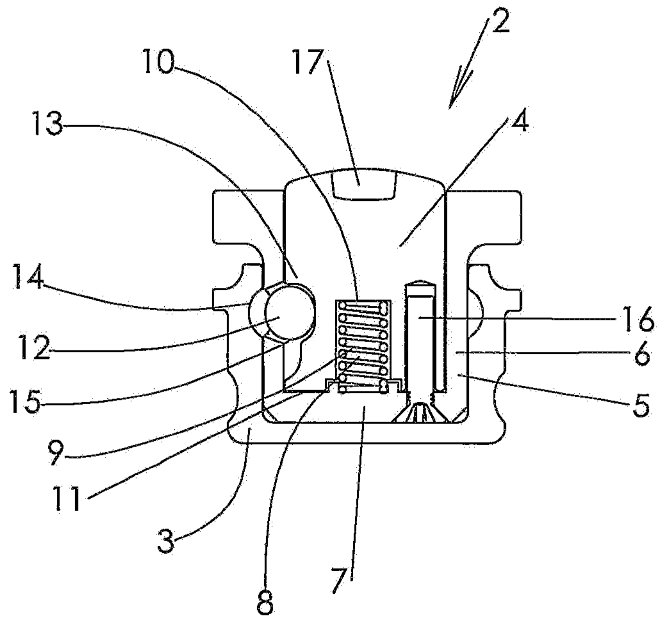
FIG. 2 is a half section showing the device in its removable (unlocking) position and removed from the surfboard.

Referring to FIGS. 1 and 2 the first male member 2 has two primary parts, an inner part 4 slidably moving within an outer part 5. The outer part 5 can be cup shaped with cylindrical walls 6 extending upwards from a base portion 7. The inner part 4 slidably fits within the cylindrical portion 6 of the outer part 5. While a cylindrical section is shown, any other suitable cross section that can perform the function of the inner and outer parts can be used. The combined inner and outer parts is referred to also as a "locking member".

The inner part 4 is resiliently biased by a resilient plug or spring 8 within a chamber 9 in the inner part, operative between the floor of the base portion 7 and the ceiling 10 of the chamber 9.

The inner part 4 moves between two positions. A first position is that shown in FIG. 1 which is the locked position, where the device with leg rope attached is secured to the surfboard. The second position can be termed the unlocking position in which the first male member 2 can be removed from the second female member 3 and therefore from the surfboard. This unlocking position is shown in FIG. 2.

Figure 3:
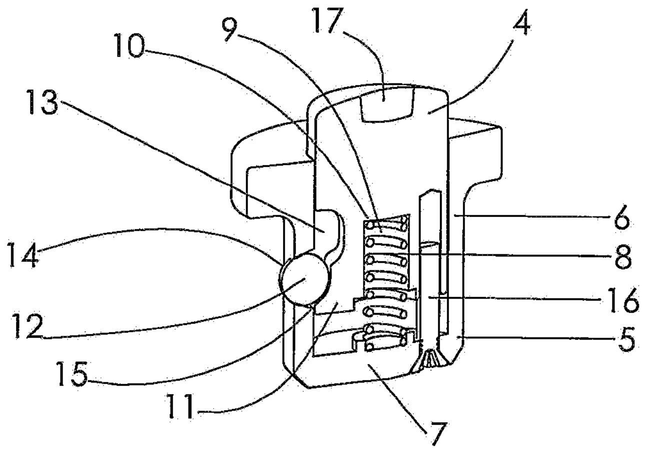
FIG. 3 is a perspective view of a half section of the first male member removed from the second female member.
Figure 4:
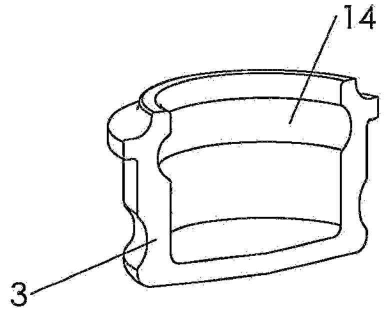
FIG. 4 is a perspective view of a half section of the second female member that is normally secured within the board.

The separated first and second members are shown in FIGS. 3 and 4.

In the locked position the spring biases the inner part 4 upwards in the configuration shown in FIG. 1 so that the base 11 of the inner part 4 is raised above the floor of the base portion 7 of the outer cup-like part 5.

In the locking operation the inner part 4 and outer part 5 are initially in the positions shown in FIG. 2. In that position a ball bearing 12 is located partly in a cavity 13 in the inner part 4 and partly in an aperture 21 through the wall of outer part 5. In that position the spring 8 is compressed and the ball bearing 12 is wholly within the first male member 2 (comprising inner 4 and outer 5 parts).

The ball bearing system needs to be robust to ensure that the locked position is retained. Three ball bearings are desirable to ensure the locking forces are uniformly spread around the device to resist the shock resulting from a sudden loss of control of the board by a rider and the consequent sharp tug of the leash on the device. Usually, the leash is elastic to a minimal extent to soften the shock in such a situation. There can be four ball bearings equally spaced if desired.

The device will normally have three ball bearings located at 120° intervals around the perimeter of the inner part 4 (See FIG. 14). Four ball bearings are possible located at 90° intervals. Each ball bearing moves between two positions according to a planned program. The locked position shown in FIG. 1 in which it partially protrudes through an aperture 21 into a complementary annular cavity 14 in second female member 3 (more clearly shown in FIG. 4) and the unlocking position shown in FIG. 2 in which the ball bearing 12 does not protrude into cavity 14.

In the locked position the protruding part of each ball into cavity 14 prevents upward or downward movement of first male member 2 within the second female member 3.

The operation of the device will now be described with reference to FIGS. 5 to 13. Each of these figures shows in sequence a position in the cycle from the locked position (FIG. 5 corresponding to the position in FIG. 1) through the unlocking position (FIG. 6 corresponding to the position in FIG. 2) to the position where the first male member 2 is removed from the second female member 3 (FIG. 9) and then back to connecting the first member 2 to the second member 3 (FIG. 10) followed by downwardly directed hand pressure to the top 17 of inner part 4 through Figs and 10 to 13, eventually to its prelocked position (FIG. 13) where upon release of hand pressure the first member 2 will rise under spring pressure to the locked position (FIG. 5).

Each part of the device is configured and each ball bearing is located in positions in the device so that each ball bearing moves according to a predetermined program as will be clearer from the description below.

Figure 6:
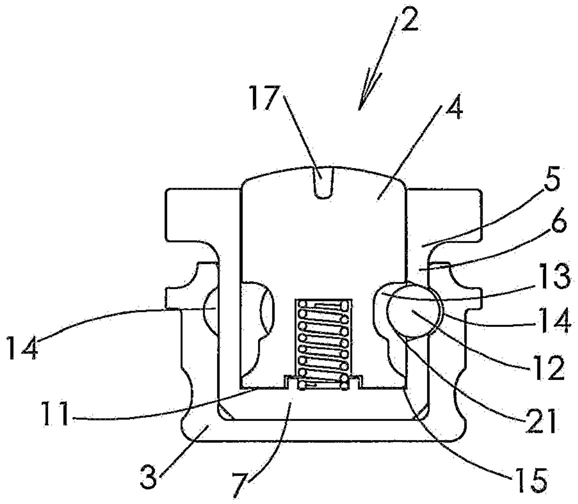
Figure 7:
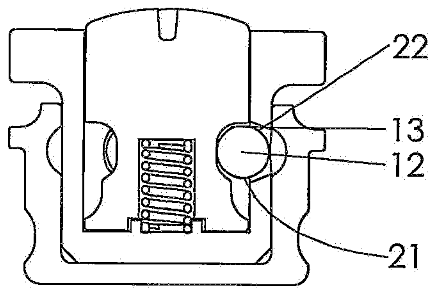

Referring to FIGS. 5 and 6, hand pressure downwardly on the top 17 of inner part 4 of first male member indicated by arrow 2 forces inner part 4 downwards, compresses spring 8 from its largely uncompressed state shown in FIG. 5 to a more compressed state shown in FIG. 6. Base 11 of inner part 4, initially raised above the floor of base portion 7 of outer part 5 (FIG. 5), moves to contact that floor (FIG. 6). This brings cavity 13 in inner part 4 into alignment with an aperture 21 through the wall in the cylindrical part 6 of the cup-like outer part 5. As better seen in FIG. 6 ball bearing 12 momentarily rests protruding into cavity 14 in second female member 3. At this point as will become clearer later, the part of ball bearing 12 protruding into cavity 14 prevents movement upwardly of the outer part 5 relative to second female member 3.

At this position (FIG. 6) cavity 13 in inner part 4 is aligned with ball bearing 12 through an aperture 21 through the wall of the cylindrical cup part 6 of outer part 5. The ball bearing is not restrained in this position and rolls down the surface of the aperture to be temporarily in the position in FIG. 7 where it stops upward relative movement of the inner part 4 within cup-like outer part 5, while permitting upward movement of both parts 4 and 5 (comprising the first male member 2) relative to the second female member 3.

Upward pressure is then applied to the first male member 2 such as by the user then pulling on the leash (not shown here but attached to first male member 2 as shown in FIG. 1), while maintaining the inner part 2 in that position such as by maintaining downward hand pressure on top 17, to then urge the first male member 2, including both inner and outer parts 4 and 5 travelling together, upwardly relative to second female member 3. This movement is possible as the outermost point on the outwardly facing surface of the ball (the equatorial point 23 (FIG. 8)) does not protrude beyond the outer wall 24 of the outer part 5. The push/pull action can be a downward push by a finger and the remaining fingers of that hand gripping the periphery of the upper part of the outer part 5 and lifting that part to raise it clear of the second female member shown in FIG. 8.

Figure 8:
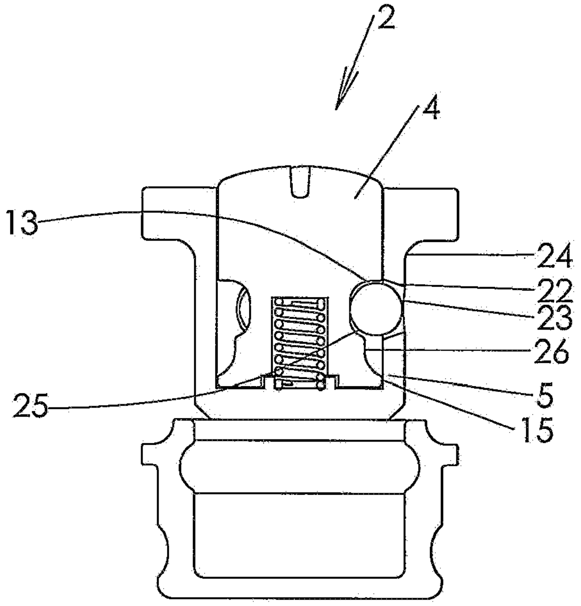
Figure 9:
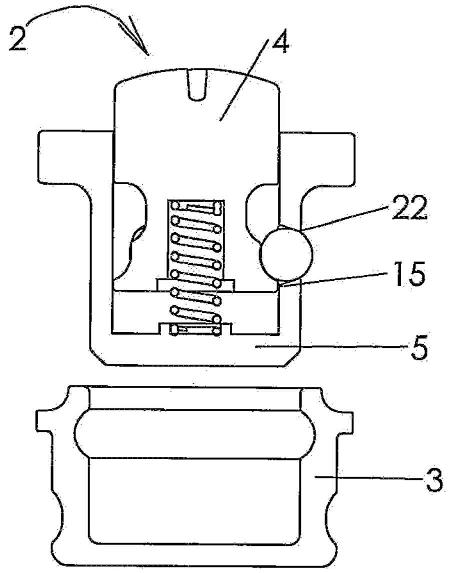

Once clear of the second female member 3 and release of downward hand pressure the spring 8 can continue to urge the inner part 4 upwardly relative to the outer part 5. This is initially prevented by the protrusion of ball 12 into cavity 13 (FIG. 8). The ball bearing through pressure exerted by the spring 8 and hence the surface 25 of cavity 13 and then cut out surface 26 and finally lug portion 15 is urged into and partially through the aperture 21, (FIG. 9). The aperture 21 has a diameter at its outer rim 22 smaller than the diameter of the ball. The ball cannot escape from the first male member 2 (See FIGS. 8 and 9).

The dimensions of all parts are designed so that there is at least a neat fit that permits vertical sliding motion and rotational motion of the individual parts relative to each other and for the ball bearing to act as a lock to prevent further movement when required. Normally the diameter of the opening 22 at the outer surface of wall 5 of aperture 21 is less than 90% of the ball bearing diameter. This can be reduced even further if sufficient volume of the ball protrudes through the opening 22 to block relative movement between the first male member and second female member in the locked position.

All parts of first male member 2 are thus locked and joined to the leash (FIG. 9). The leash and first male member 2 can then be stored for next time of use.

The diameter of the opening 22 of the aperture 21 at the outer surface of the outer part 5, is substantially the same as that of the opening in the complementary cavity 14 in the second female member 3. The circumferential surface of the aperture 21 is sloped so that the diameter at the outer surface 22 is less than that at the inner surface of the outer part 5. The depth of the cavity 14 is less than half the diameter of each ball which facilitates the inward movement of the ball inwardly from its position within the cavity 14 when the cavity 14 is aligned with aperture 21.

Figure 10:
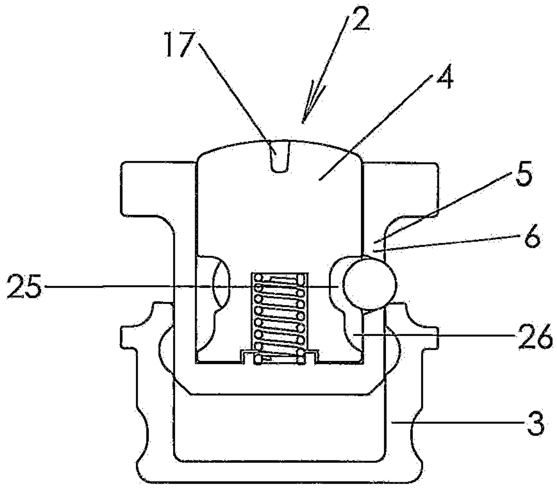

The operation to insert the first male member 2 back into the second member will be understood starting by reference to FIG. 10. The first male member 2 is aligned with and inserted by hand into the second female member 3 until the protruding portion 26 of the ball engages with the upper lip 25 of the second member 3.

Figure 11:
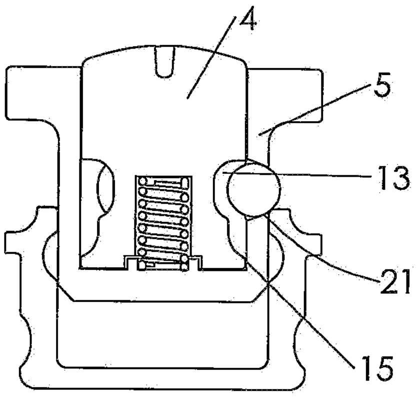

Downward hand force is applied to top 17 of inner part 4 to move inner part 4 downwards within outer part 5 to the position in FIG. 11 where cavity 13 in inner part 4 is aligned with the aperture 21 through the wall of outer part 5.

Figure 12:
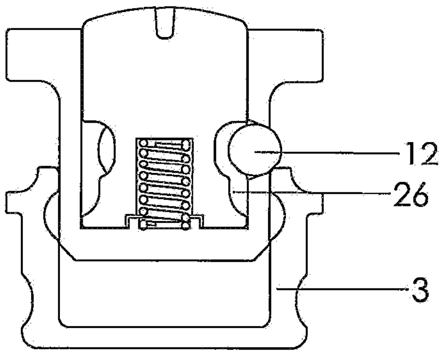

Further downward hand force causes lip 25 to exert force on the ball in such a direction that the ball is then driven inwardly into the cavity 13 to the position shown in FIG. 12 where the protrusion of the ball beyond the external wall of outer part 5 is minimal and the lip 25 of second female member 3 is almost free to pass the protruding ball.

Figure 13:
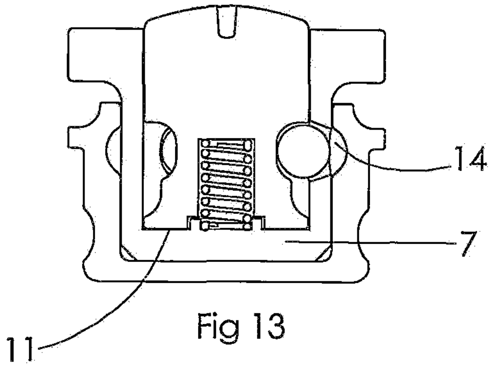

Continuing downward hand force results in the ball eventually nesting neatly within the confines of the cavity 13 and aperture 21. The ball 12 is then aligned with annular cavity 14 in second female member 3 as shown in FIG. 13 with base 11 of inner part 4 contacting the floor of the base portion 7 of outer part 5.

Release of the hand force brings the compressed spring back into play, and this drives inner part 4 upwards which in turn drives the ball 12 fully into the annular cavity 14 in second female member 3 to reach the locked position of FIG. 5.

The device of the invention includes a locking pin 16 (FIGS. 1 and 2) locking inner part 4 to outer part 5 to prevent rotational motion of inner part 4 relative to outer part 5. Locking pin 16 can be a screw threaded bolt being screwed through a recess in the floor of outer part 5 into a chamber located within the inner part 4.

The materials used in manufacture of the device need to be of sufficient strength to remain dimensionally accurate over the useful period of the device. The second female member, and the inner and outer parts of the first male member, can be made by injection moulding of each part from a suitable material.

The ball bearing will be of a suitable corrosion resistant material such as stainless steel.

Assembly of the device will now be described referring to FIGS. 1-3, FIG. 14 and other Figures where required.

Three ball bearings 12A, 12B and 12C (FIG. 14) are inserted into outer part 5 and held in the three complementary cavities by a suitable retaining means such as sticky tape. Spring 8 is inserted into its chamber 9 in inner part 4 and that part is then slid into the outer part 5, and rotated if necessary so that lug 15 can pass each of the balls until base 11 settles at its lowest location (FIG. 2). Three cut outs 27A, 27B and 27C can be provided in the lug 15 of sufficient size and shape to pass over the balls. The Inner part 5 is then rotated so that the cut-outs are not in alignment with each ball.

Inner part 4 is further rotated if necessary to align the chamber for locking screw 16 with its aperture through base 7. Screw 16, when tightened, stops inner part 4 from rotating once assembled. At this point the only movement available for inner part 4 is upwards away from base 7 and then only until lug 15 (FIG. 1) contacts the protruding part of ball 12 which stops inner part 4 from coming out of outer part 5.

Hand pressure is released, spring 8 forces inner part 4 upwards allowing lug 15 to bind onto each bearing.

The first male member 2 is then ready to fit into second (female) member 3 secured within a surfboard after removing if necessary the retaining means used to initially hold each ball bearing in its complementary cavity.

To inhibit egress of sand and other undesirable materials the device has no unnecessary openings in its outer surfaces.

While this invention has been described with reference to specific features, it is not to be construed as being limited thereto. Furthermore, where equivalents are known to exist to specific features, such equivalents are included herein as if specifically set forth.

The term “comprising” when used throughout this specification and claims means “consisting at least in part of” and is therefore used inclusively to permit other features to be included in a statement containing that term in addition to those that are specifically stated following that term.

INDUSTRIAL APPLICABILITY

Surfboards are sold and used in multimillion numbers throughout the world. A device which can make it simpler for a surfer or other user of a board used in water sports to removably connect the board to the leg rope clearly has industrial applicability. In other industries similar benefits will clearly exist as well.

The invention claimed is:

1. A device for removably connecting two pieces of an apparatus together comprising: two members, a first male member and a second female member, the first male member securable to one piece of the apparatus and the second female member being securable to a second piece of the apparatus, the first male member being configured to be in two positions in relation to the second female member, a first locked position in which the first male member is locked to the second female member and therefore the two pieces of apparatus are connected and a second unlocking position in which the first male member can be separated from the second female member to disconnect the two pieces of apparatus, wherein the first male member has two parts, a first outer part and a second inner part both configured to allow the second inner part to be slidable within the first outer part and locked against rotational movement of the second inner part within the first outer part, both the first outer part and the second inner part being configured to receive ball bearings in an arrangement to permit the second inner part to slidably move within the first outer part under a locking force applied by a biassing member toward a locked position and under hand pressure applied to the second inner part against a force applied by the biassing member to slidably move to an unlocking position.

2. The device as claimed in claim 1, wherein the device is configured for removably connecting a leash to a board wherein the first male member is adapted to be attachable to one end of the leash and the second female member is securable to the board.

3. The device as claimed in claim 2 wherein both the inner and outer parts are configured to receive the ball bearings in the arrangement to permit each ball bearing to move between the locked position, wherein each ball bearing partially protrudes through an aperture in a wall of the first outer part into a complementary annular cavity in the second female member and an unlocked position wherein the each ball bearing does not protrude beyond an external wall surface of the first outer part, such that the first male member can be disengaged from the second female member.

4. The device as claimed in claim 3 wherein each ball bearing is retained within the first male member when disengaged from the second female member.

5. The device as claimed in claim 4 the ball bearings are 3 or 4 ball bearings.

6. The device as claimed in claim 4 the ball bearings are 4 ball bearings.

7. The device as claimed in claim 3 wherein the second female member has an internal annular cavity.

8. The device as claimed in claim 3, wherein the pressure to move from the locked position to the unlocking position is applied by hand in a direction that is maintained to hold the first male member in the unlocking position, and which prevents movement to disengage the first male member from the second female member in a different direction to that maintained by the unlocking movement.

9. The device as claimed in claim 2, wherein the board is a surfboard.

10. The device as claimed in claim 2, wherein the device is supplied together with the board, having secured within its surface the second female member.

11. The device as claimed in claim 2, wherein the device is supplied together with the leash which comprises a length of flexible cord, one end of which is adapted to be connected to a leg of a user and an other end of which is adapted to be connected to the first male member.

12. The device as claimed in claim 11, wherein the length of flexible cord and the first male member are supplied separately.

13. The device as claimed in claim 12 additionally supplied with the board having the second female member secured within its surface.

* * * * *